US012696018B2

(12) United States Patent
Rubietta et al.

(10) Patent No.: US 12,696,018 B2
(45) Date of Patent: Jul. 28, 2026

(54) WORKSITE AUDIO DEVICE

(71) Applicant: MILWAUKEE ELECTRIC TOOL CORPORATION, Brookfield, WI (US)

(72) Inventors: Chelsea L. Rubietta, Loveland, OH (US); Matthew D. Strommen, Greendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 268 days.

(21) Appl. No.: 18/493,868

(22) Filed: Oct. 25, 2023

(65) Prior Publication Data

US 2024/0155275 A1 May 9, 2024

Related U.S. Application Data

(60) Provisional application No. 63/382,796, filed on Nov. 8, 2022.

(51) Int. Cl.
*H04R 1/02* (2006.01)
*H04R 1/06* (2006.01)

(52) U.S. Cl.
CPC ............... *H04R 1/025* (2013.01); *H04R 1/06* (2013.01); *H04R 2201/028* (2013.01); *H04R 2201/029* (2013.01)

(58) Field of Classification Search
CPC .... H04R 1/025; H04R 1/06; H04R 2201/028; H04R 2201/029
USPC .......................................................... 381/386
See application file for complete search history.

(56) References Cited

U.S. PATENT DOCUMENTS

| | | | |
|---|---|---|---|
| D310,220 | S | 8/1990 | Hirose et al. |
| D418,836 | S | 1/2000 | Matt et al. |
| D475,966 | S | 6/2003 | Chunn et al. |
| D479,223 | S | 9/2003 | Furusho et al. |
| D726,142 | S | 4/2015 | Itoh et al. |
| D1,028,933 | S | 5/2024 | Liao |

(Continued)

FOREIGN PATENT DOCUMENTS

| | | |
|---|---|---|
| CN | 308611729 | 4/2024 |

OTHER PUBLICATIONS

Ridgid, "Ridgid 18V Hybrid Jobsite Radio with Bluetooth Technology (Tool Only)," <https://www.amazon.com/RIDGID-Hybrid-Jobsite-Bluetooth-Technology/dp/B0CCSLYPW2> web page visited Jul. 1, 2025 (6 pages).

(Continued)

*Primary Examiner* — Sean H Nguyen
(74) *Attorney, Agent, or Firm* — Michael Best & Friedrich LLP

(57) ABSTRACT

A worksite audio device includes a housing including a front side and a rear side, a speaker disposed on the front side of the housing, an audio circuit coupled to the speaker that provides an audio signal to the speaker, and an antenna assembly coupled to the housing and configured to deliver a radio signal to the audio circuit. The speaker is configured to output audio. The antenna assembly is rotatable with respect to the housing about a first axis, a second axis perpendicular to the first axis, and a third axis perpendicular to the second axis. A handle is coupled to the housing and cooperates with the housing to define a recess. A first device mount is disposed in the recess and configured to support an electronic device couplable to the audio circuit.

19 Claims, 13 Drawing Sheets

(56) References Cited

U.S. PATENT DOCUMENTS

| | | | | |
|---|---|---|---|---|
| D1,052,554 | S | 11/2024 | She | |
| D1,058,530 | S | 1/2025 | Liu | |
| 2006/0148419 | A1 * | 7/2006 | Shin | H04N 5/38 455/344 |
| 2013/0006405 | A1 * | 1/2013 | Tsuge | H04B 1/08 700/94 |
| 2013/0177198 | A1 * | 7/2013 | Hogue | H04R 5/04 381/394 |

OTHER PUBLICATIONS

Milwaukee Electric Tool Corp, “2952-20 for Milwaukee M18 Bluetooth Jobsite Radio (Bare Tool),” <https://www.amazon.com/2952-20-Milwaukee-Bluetooth-Jobsite-Radio/dp/BODJRKGKRW?gQT=2> web page visited Jul. 1, 2025 (7 pages).

* cited by examiner

WORKSITE AUDIO DEVICE

CROSS REFERENCE TO RELATED APPLICATIONS

This application claims priority to U.S. Provisional Patent Application No. 63/382,796, filed Nov. 8, 2022, the entire contents of which are incorporated herein.

BACKGROUND

Audio devices are frequently used in worksites to provide music or other entertainment to people in the surrounding area. Often such audio devices are equipped with antennae to receive radio signals.

SUMMARY

A worksite audio device, according to some embodiments, includes a housing having a front side and a rear side and a speaker disposed on the front side of the housing. The speaker is configured to output audio. An audio circuit is coupled to the speaker and provides an audio signal to the speaker. A handle is coupled to the housing and the handle and the housing cooperate to define a recess. The recess is configured to receive and support an electronic device.

A worksite audio device, according to some embodiments, includes a housing having a front side and a rear side and a speaker disposed on the front side of the housing, the speaker configured to output audio. An audio circuit is coupled to the speaker and provides an audio signal to the speaker and an antenna assembly is coupled to the housing and is configured to deliver a radio signal to the audio circuit. The antenna assembly includes a first member rotatably coupled to the housing and rotatable about a first axis, a second member coupled to the first member, and a third member coupled to the second member. The second member is configured to pivot relative to the first member about a second axis, perpendicular to the first axis. The third member is configured to pivot relative to the second member about a third axis, wherein the third axis is perpendicular to the second axis.

A worksite audio device, according to some embodiments, includes a housing having a front side and a rear side and a speaker disposed on the front side of the housing. The speaker is configured to output audio. An audio circuit is coupled to the speaker and provides an audio signal to the speaker. An antenna assembly is coupled to the housing and is configured to deliver a radio signal to the audio circuit. The antenna assembly is rotatable with respect to the housing about a first axis, a second axis, perpendicular to the first axis, and a third axis, perpendicular to the second axis. A handle is coupled to the housing to cooperate therewith to define a recess. A first device mount is disposed within the recess and is configured to support an electronic device couplable to the audio circuit.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of “including,” “comprising,” or “having” and variations thereof are meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits (“ASICs”). As such, it should be noted that a plurality of hardware and software based devices, as well as a plurality of different structural components, may be utilized to implement the embodiments. For example, “servers,” “computing devices,” “controllers,” “processors,” etc., described in the specification can include one or more processing units, one or more computer-readable medium modules, one or more input/output interfaces, and various connections (e.g., a system bus) connecting the components.

Relative terminology, such as, for example, “about,” “approximately,” “substantially,” etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression “from about 2 to about 4” also discloses the range “from 2 to 4”. The relative terminology may refer to plus or minus a percentage (e.g., 1%, 5%, 10%, or more) of an indicated value as would be understood by a person of ordinary skill in the art related to the quantity or condition.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is “configured” in a certain way is configured in at least that way but may also be configured in ways that are not explicitly listed.

Other aspects of the embodiments will become apparent by consideration of the detailed description and accompanying drawings.

DETAILED DESCRIPTION

FIGS. 1-13 illustrate an audio device 100 that is portable and battery powered. The audio device 100 may be referred to as a worksite audio device 100 (for example, a jobsite radio). Audio devices like the audio device 100 are often found on construction sites in order to provide music or other audio to the people in the surrounding area. The audio devices need to be durable for transport to or use in a construction area.

Figure 1:
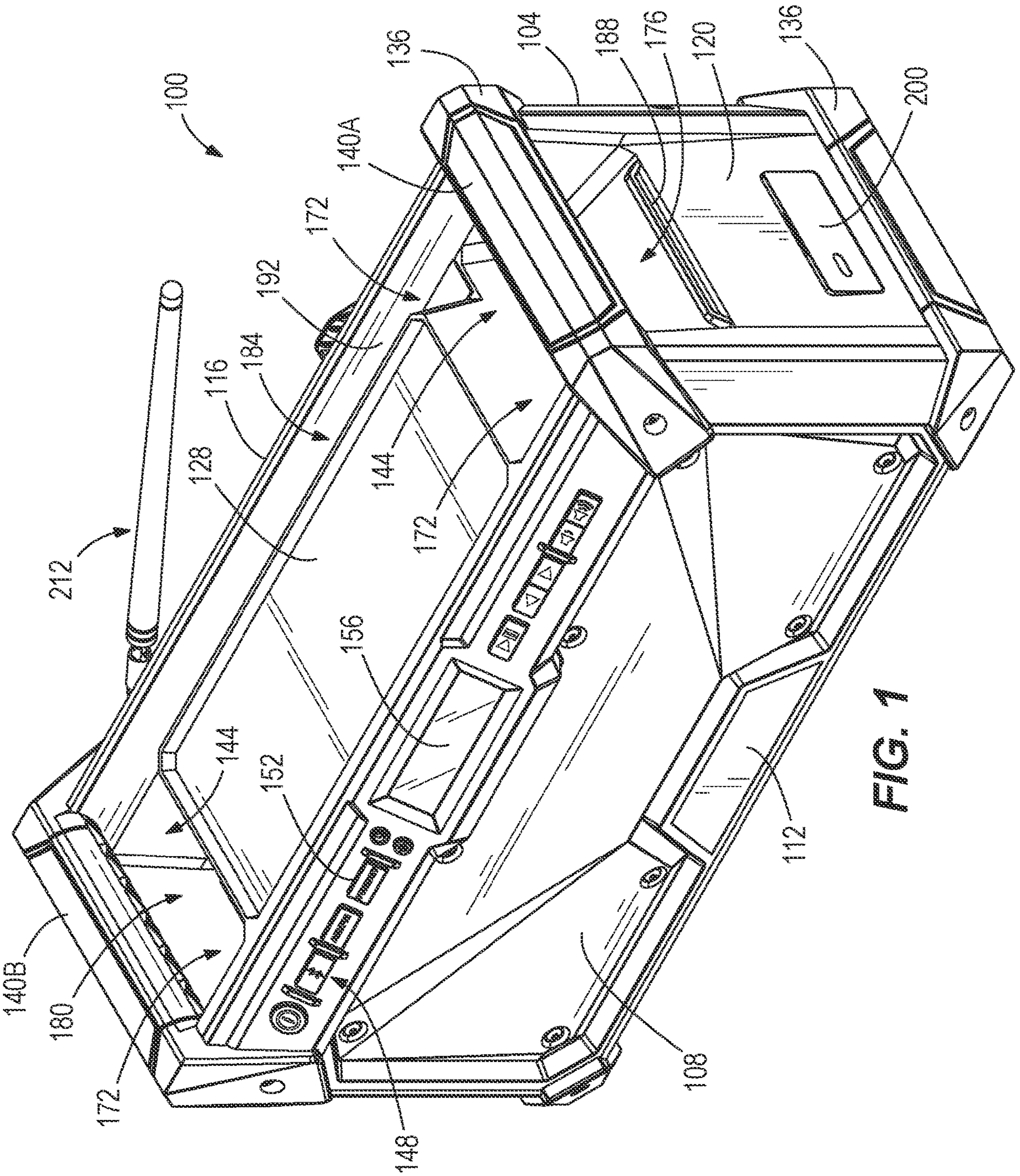
FIG. 1 is a front perspective view of an audio device in accordance with some embodiments.
Figure 2:
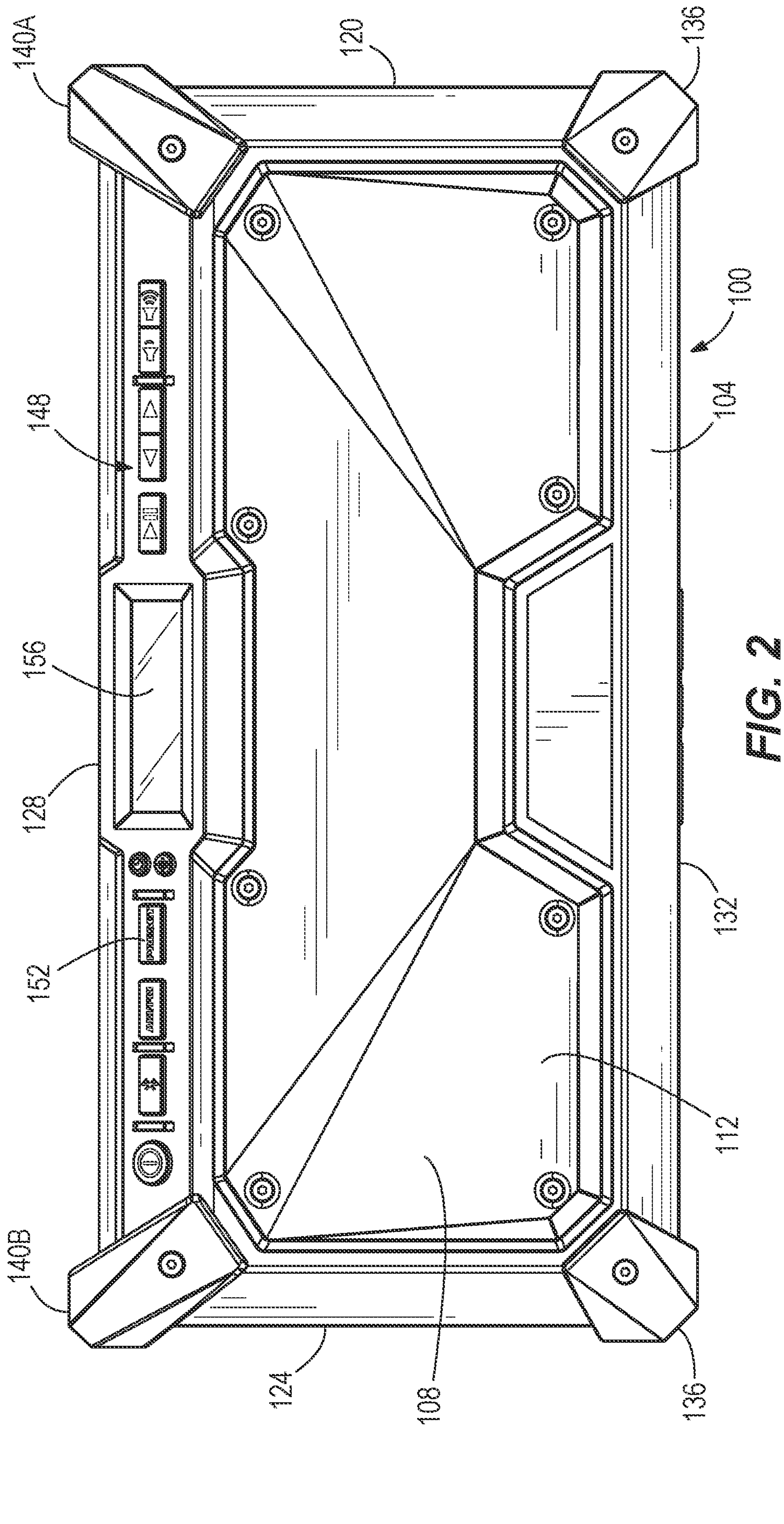
FIG. 2 is a front view of the audio device of FIG. 1 in accordance with some embodiments.
Figure 3:
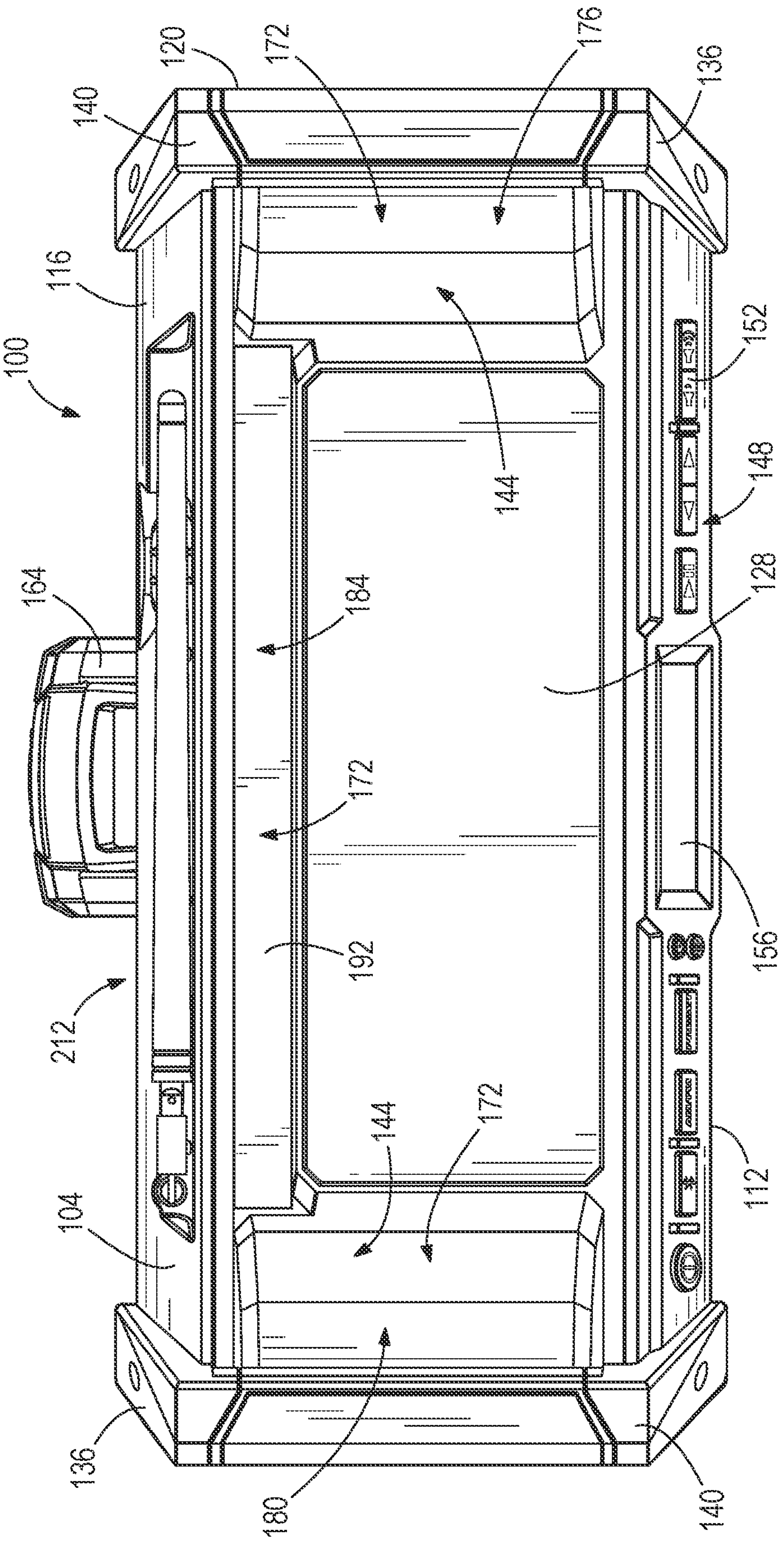
FIG. 3 is a top view of the audio device of FIG. 1 in accordance with some embodiments.
Figure 4:
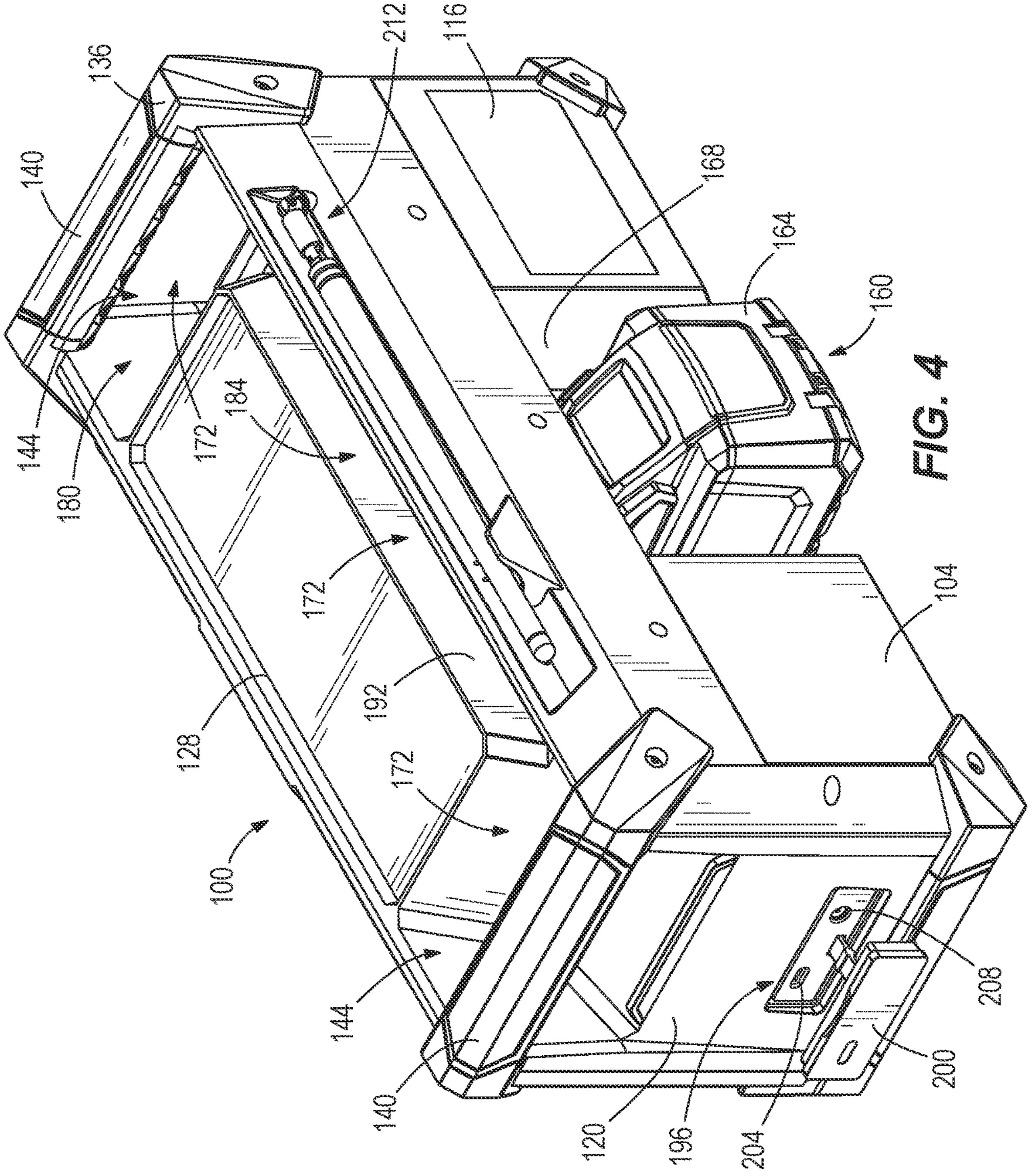
FIG. 4 is a rear perspective view of the audio device of FIG. 1 in accordance with some embodiments.
Figure 5:
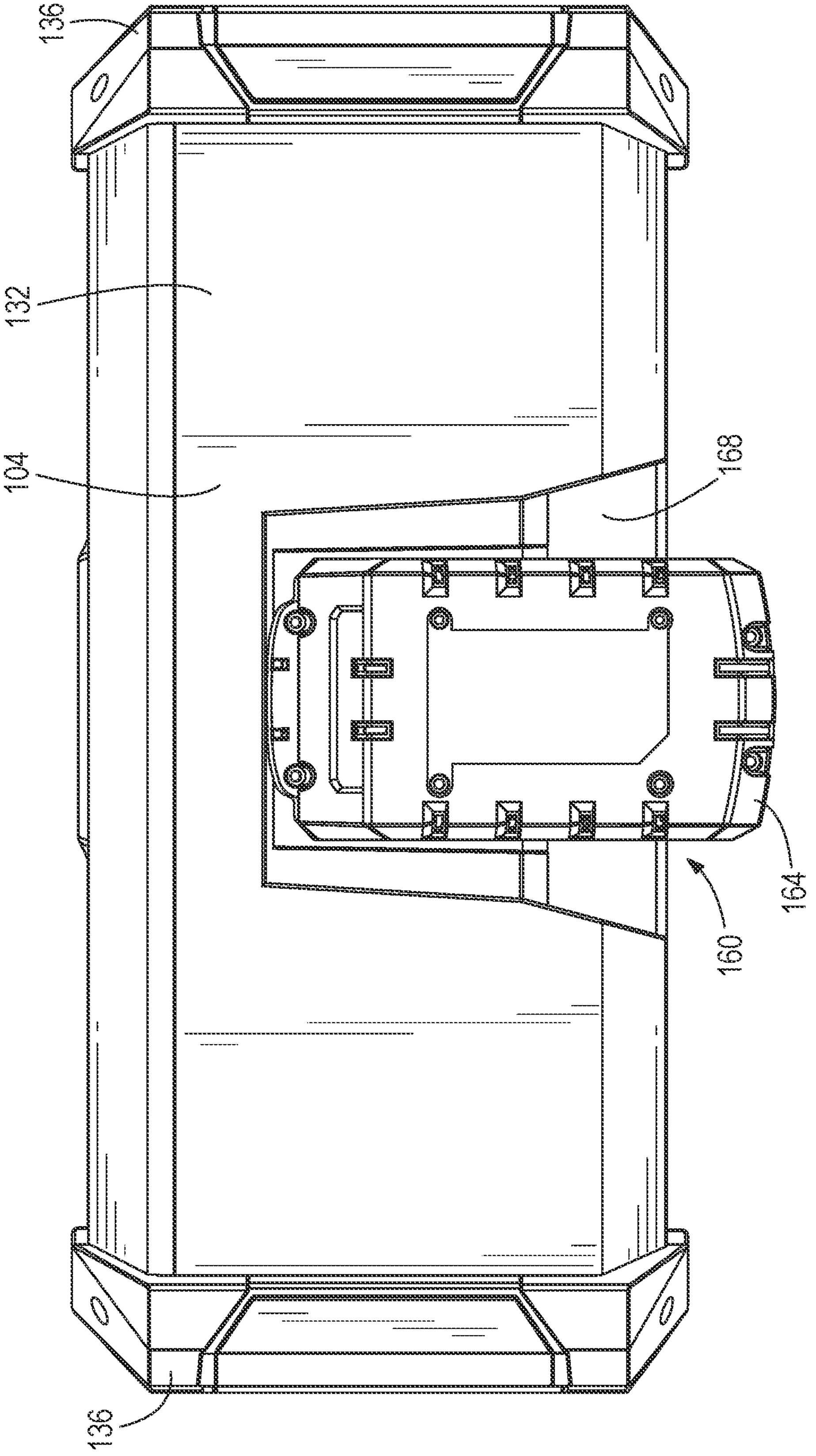
FIG. 5 is a bottom view of the audio device of FIG. 1 in accordance with some embodiments.
Figure 6:
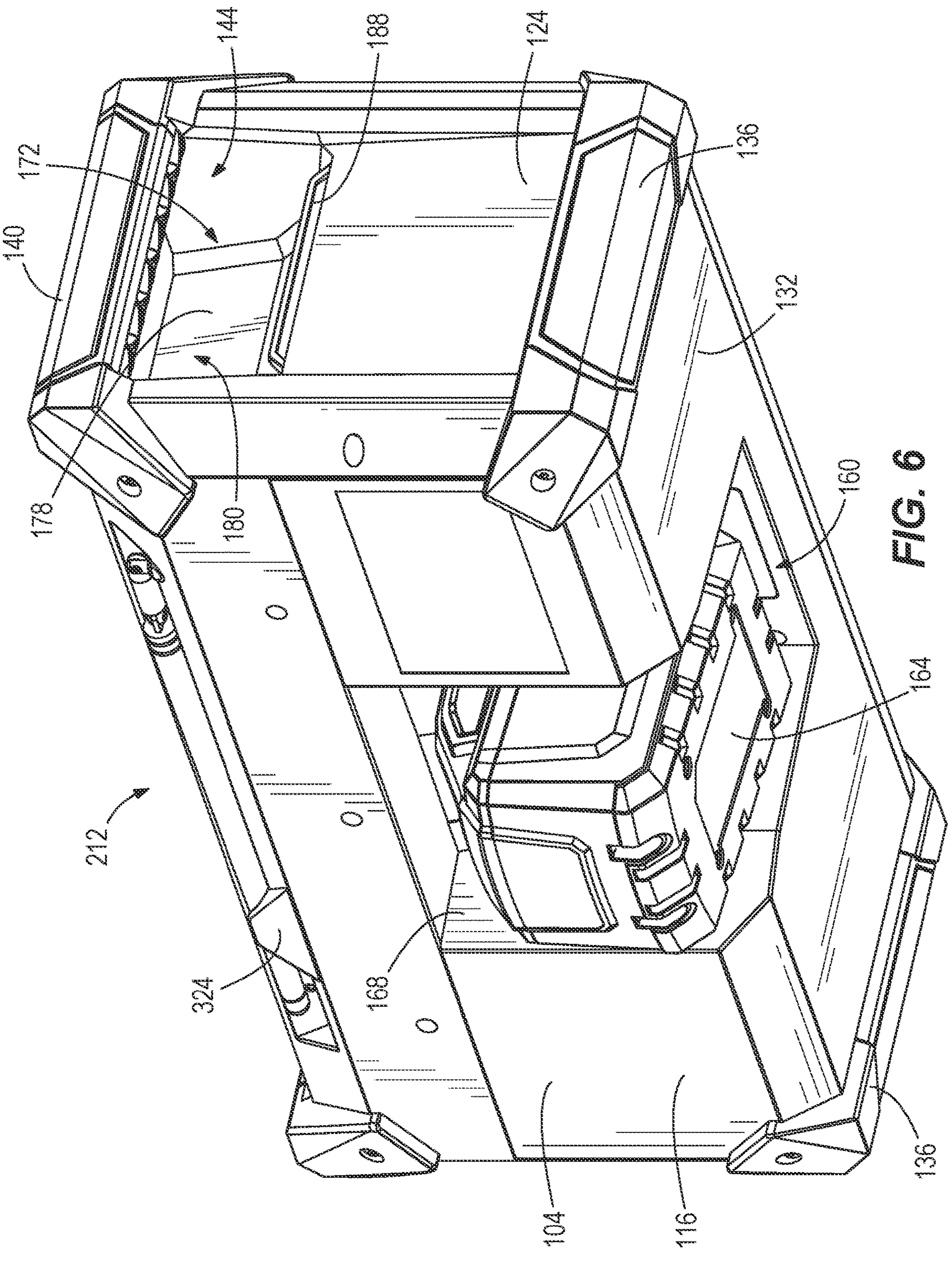
FIG. 6 is a rear perspective view of an audio device of FIG. 1 in accordance with some embodiments.
Figure 7:
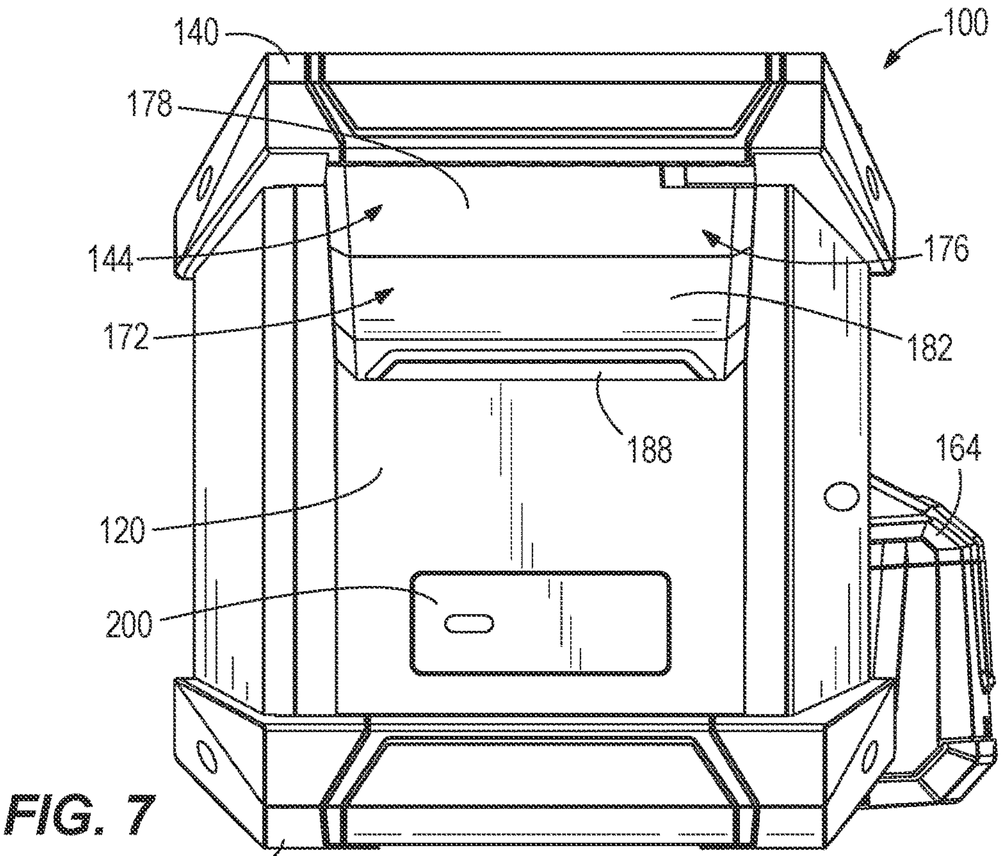
FIG. 7 is a side view of the audio device of FIG. 1 in accordance with some embodiments.

FIGS. 1-2 illustrate the audio device 100. The audio device 100 includes a housing 104 containing a speaker 108, an audio circuit 332 (FIG. 14) connected to the speaker 108, and a controller 334 (FIG. 14) configured to control the audio circuit to provide an audio signal to the speaker 108. The housing 104 may be generally rectangular cuboid and includes a front side 112, a rear side 116, a pair of sidewalls including a first sidewall 120 and a second sidewall 124, a top surface 128, and a bottom surface 132. The front side 112 may also be referred to as a first side, and the rear side 116 may also be referred to as a second side that is opposite the first side. The speaker 108 is coupled to the front side 112 of the housing 104. The audio device 100 may include a roll cage 136 or frame 136 mounted on the housing 104. The roll cage 136 may define one or more handles 140. The roll cage 136 may protect the housing 104 from damage in the event of a drop or other shock to the audio device 100. The handles 140 include, for example, a first handle 140A and a second handle 140B. The first handle 140A is coupled to an upper edge of the housing 104 adjacent the first sidewall 120 and extends between the front side 112 and the rear side 116 in the direction of the first sidewall 120. The second handle 140B is coupled to an upper edge of the housing 104 adjacent the second sidewall 124 and extends between the front side 112 and the rear side 116 along the second sidewall 124. The handles 140 may be provided along or adjacent the top surface 128 of the housing 104. The handles 140 may be gripped by a user to transport the portable audio device 100. In the illustrated embodiment, a hand-receiving space 144 is defined between the housing 104 and each of the handles 140.

The audio device 100 also includes a user interface 148. In some embodiments, the user interface 148 may include a plurality of buttons 152 which enable a user to provide input to control the audio output by the speaker 108. The user interface 148 may also include a display 156 to communicate information to the user about the audio output, the audio device, or an attached device. The user interface 148 may be positioned on the front side 112 of the housing 104 adjacent the speaker 108. For example, the user interface 148 may be positioned above the speaker 108.

As seen in FIGS. 3-6, the audio device 100 includes a battery receiving area 160. The battery receiving area 160 (or battery receptacle 160) includes an interface that electrically and mechanically supports a battery pack 164. The battery pack 164 may be a rechargeable power tool battery pack, such as an 18 volt Li-ion battery pack. In some embodiments, the battery pack 164 may be any style of rechargeable battery. In some embodiments, the battery receiving area 160 may alternatively or additionally include a plug port for connecting to an AC power source.

When the battery pack 164 is coupled to the audio device 100 and is received in the battery receiving area 160, the battery pack 164 may supply power to the controller 334 and the audio circuit 332. The battery pack 164 may be removed from the battery receiving area 160 and replaced with another battery pack, or the battery pack 164 may be connected to a charger before coupling to the audio device once more. In the illustrated embodiment, the battery receiving area 160 is formed as an alcove 168 cut out from the bottom surface 132 near the rear side 116.

Figure 8:
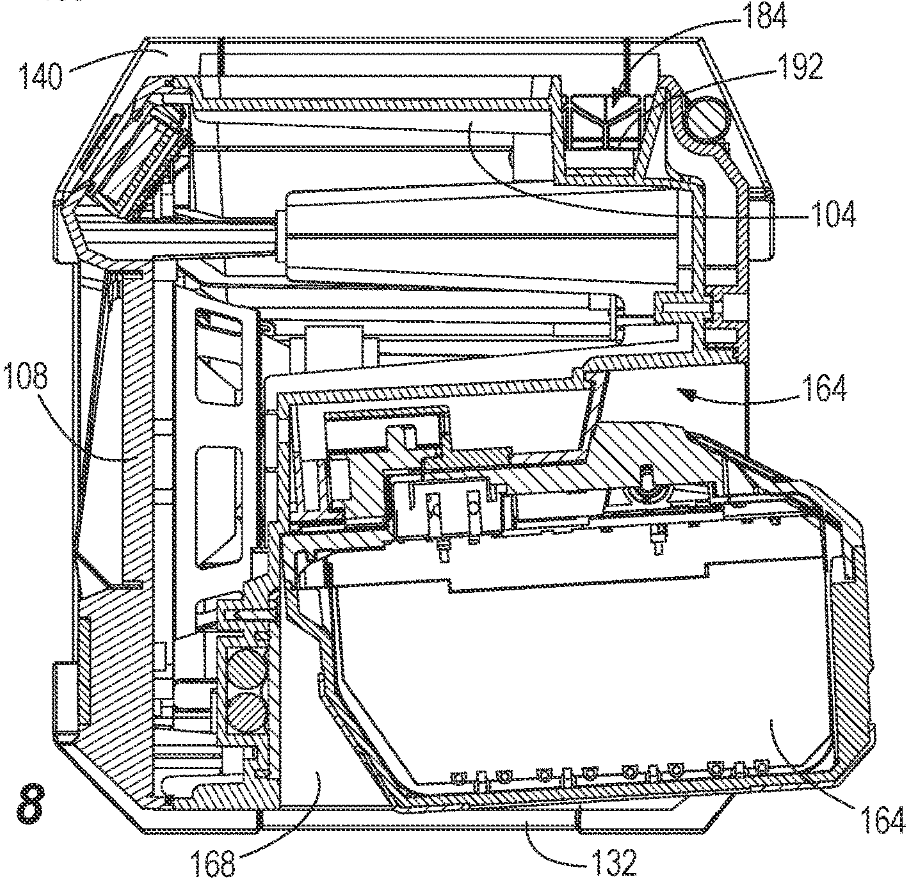
FIG. 8 is a section view of the audio device of FIG. 7 in accordance with some embodiments.

As seen best in FIG. 8, when the battery pack 164 is coupled to the audio device 100 and positioned within the battery receiving area 160, a lowest portion of the battery pack 164 may be spaced above the bottom surface 132 of the housing 104, so that when the audio device 100 is set on a surface, the battery pack 164 does not contact the surface. In some embodiments, the lowest portion of the battery pack 164 may be flush or coplanar with the bottom surface 132 of the housing 104 such that the battery pack 164 also helps support the audio device 100. When the battery pack 164 is coupled to the audio device 100, a rearmost portion of the battery pack 164 may extend past the rear side 116 of the housing 104.

Device Mounts

In some embodiments, the audio circuit of the audio device 100 may wirelessly connect to an electronic device (e.g., through Bluetooth™ technology). In some embodiments, the electronic device may be a smart phone, an MP3 player, a tablet computer, or any other portable device with access to audio information. The audio circuit may receive a wireless signal from the electronic device and may in turn provide a device audio signal to the speaker 108, which outputs a corresponding audio. In some embodiments, the audio device may be connected to the electronic device by wires, in order to provide a wired signal from the electronic device to the audio circuit. The audio circuit may then provide the audio signal to the speaker 108 which outputs an audio corresponding to the wired signal. In embodiments where the audio device 100 is connected to an electronic device, it is beneficial for the electronic device to remain near the audio device 100. Therefore, the audio device may include one or more device mounts 172 to support the electronic device while in use.

With reference to FIG. 1, the audio device 100 includes three device mounts 172 for receiving an electronic device. The audio device 100 includes a first side mount 176, a second side mount 180, and a rear mount 184. The first and second side mounts 176, 180 are symmetrically arranged on either side of the housing 104, and are substantially identical. Thus, only the first side mount 176 is described in detail. In some embodiments, the audio device 100 may only include a subset of the device mounts 172, such as only the first side mount 176 or only the first and third mounts 176, 184.

Figure 9:
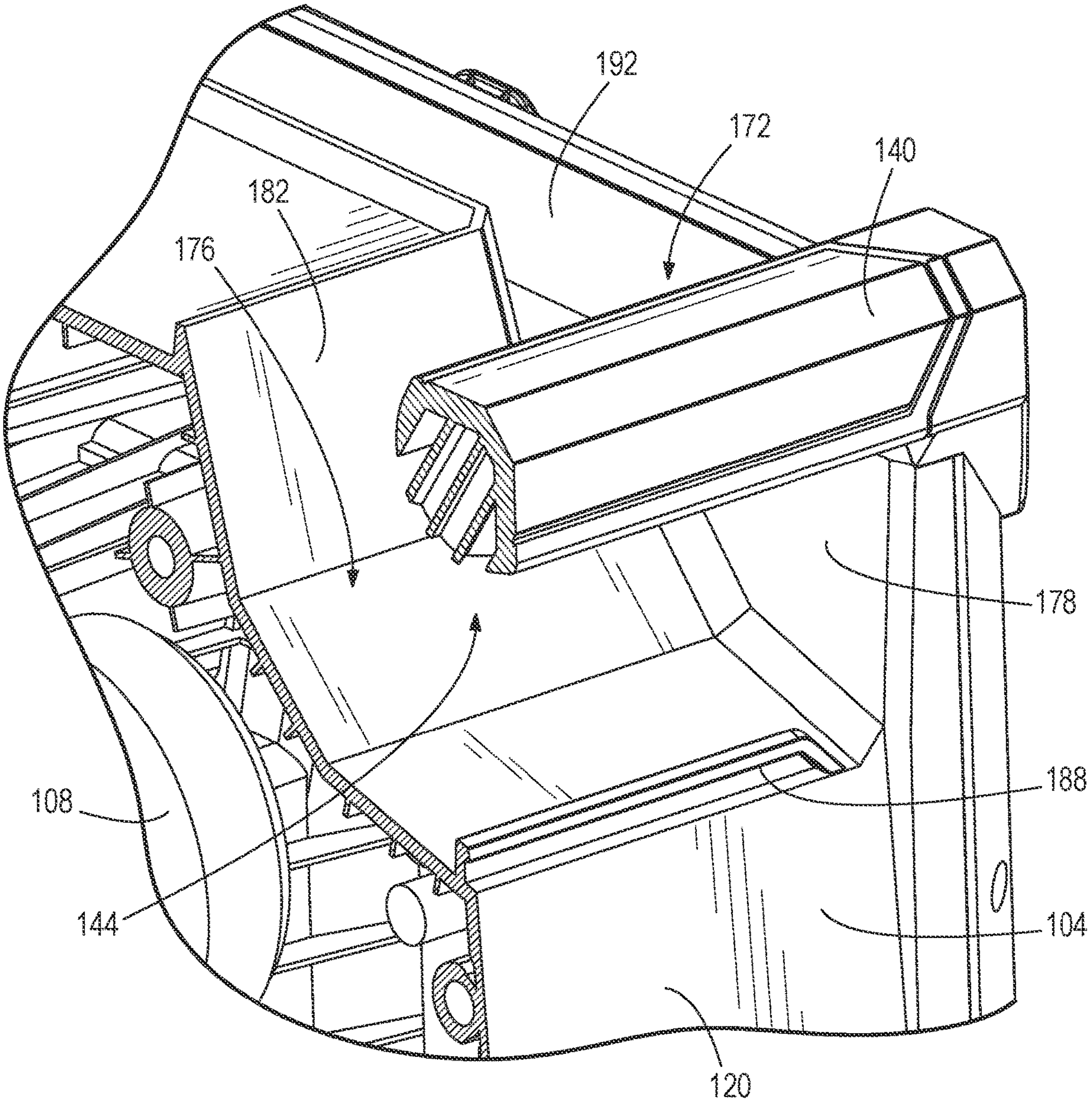
FIG. 9 is a perspective view of a cutaway of a portion of the audio device of FIG. 7 in accordance with some embodiments.

Turning to FIG. 9, the first side mount 176 is formed as a recess 178 cut out from the first sidewall 120 of the housing 104 adjacent the top surface 128. The recess 178 cooperates with the first handle 140A to define the hand-receiving space 144. The recess 178 may include a plurality of slanted surfaces 182. In the example illustrated, the plurality of slanted surfaces 182 include three flat surfaces joined at different angles (for example, at angles greater than 90 degrees) to each other. In other examples, a different configuration of the recess 178 may also be used (for example, two flat surfaces meeting at a 90 degree angle).

Adjacent the first sidewall 120, the first side mount 176 includes a ridge 188 or a device ledge 188 extending from the surface 182 of the recess 178 (for example, from a bottom surface of the recess 178). An electronic device may be positioned in the hand-receiving space 144, or on the first side mount 176, so that the end of the device abuts the ridge 188. The electronic device is inhibited from falling out of the recess 178 by the ridge 188. In some embodiments, the ridge 188 extends substantially the entire width of the recess 178 (for example, greater than 80% of the width of the recess 178). In other embodiments, the ridge 188 may extend up to only a partial width of the recess 178 (for example, less than 80% of the width of the recess 178). The ridge 188 extends upward (that is, toward the top side of the housing 104) from the recess 178. The electronic device is positioned within the roll cage 136 and is therefore afforded some protection from the environment.

Turning to FIG. 8, the rear device mount 184 is formed as a slot 192 in the top surface 128 of the housing 104. The slot 192 extends between the first and second sidewalls 120, 124 of the housing 104 (for example, between the first and the second device mounts 176, 180), adjacent the rear side 116. The electronic device may be positioned in the slot 192 such that the electronic device extends above the top surface 128.

When an electronic device is positioned on one of the device mounts 172, the electronic device may be coupled to the audio device 100 wirelessly or via wires. In some embodiments, the audio device 100 includes one or more ports 196 provided on the housing 104 for connecting to electronic devices. In the illustrated embodiment, the audio device 100 includes a panel 200 on the first sidewall 120 that is movable to an open position (FIG. 4), which exposes the ports 196. The ports 196 may include a DC power connection 204, such as a USB type port (e.g., a USB type-C port). The USB type port can be used to connect an electronic device to the audio circuit, or can be used to provide power from the attached battery pack 164 to the electronic device. The ports 196 also include an AUX type port 208, which may connect to the electronic device to connect the electronic device to the audio circuit. When connected by the wire(s), the electronic device can rest in one of the device mounts 172.

Antenna Assembly

In some embodiments, the audio device 100 may include a radio system including an antenna assembly 212 mounted on the housing 104. The radio system may provide a radio signal to the audio circuit. The audio circuit may then issue a corresponding audio signal to the speaker 108, which outputs audio in response. In embodiments where the speaker 108 is connected to the radio system, the antenna assembly 212 may be subject to unexpected forces as a result of being in a high traffic worksite, for example, if the antenna assembly 212 is hit or the audio device 100 is dropped. The durability of the antenna assembly 212 to endure any forces without damage to the radio system may be increased by increasing the amount of articulation of the antenna assembly 212 relative to the housing 104.

Figure 10:
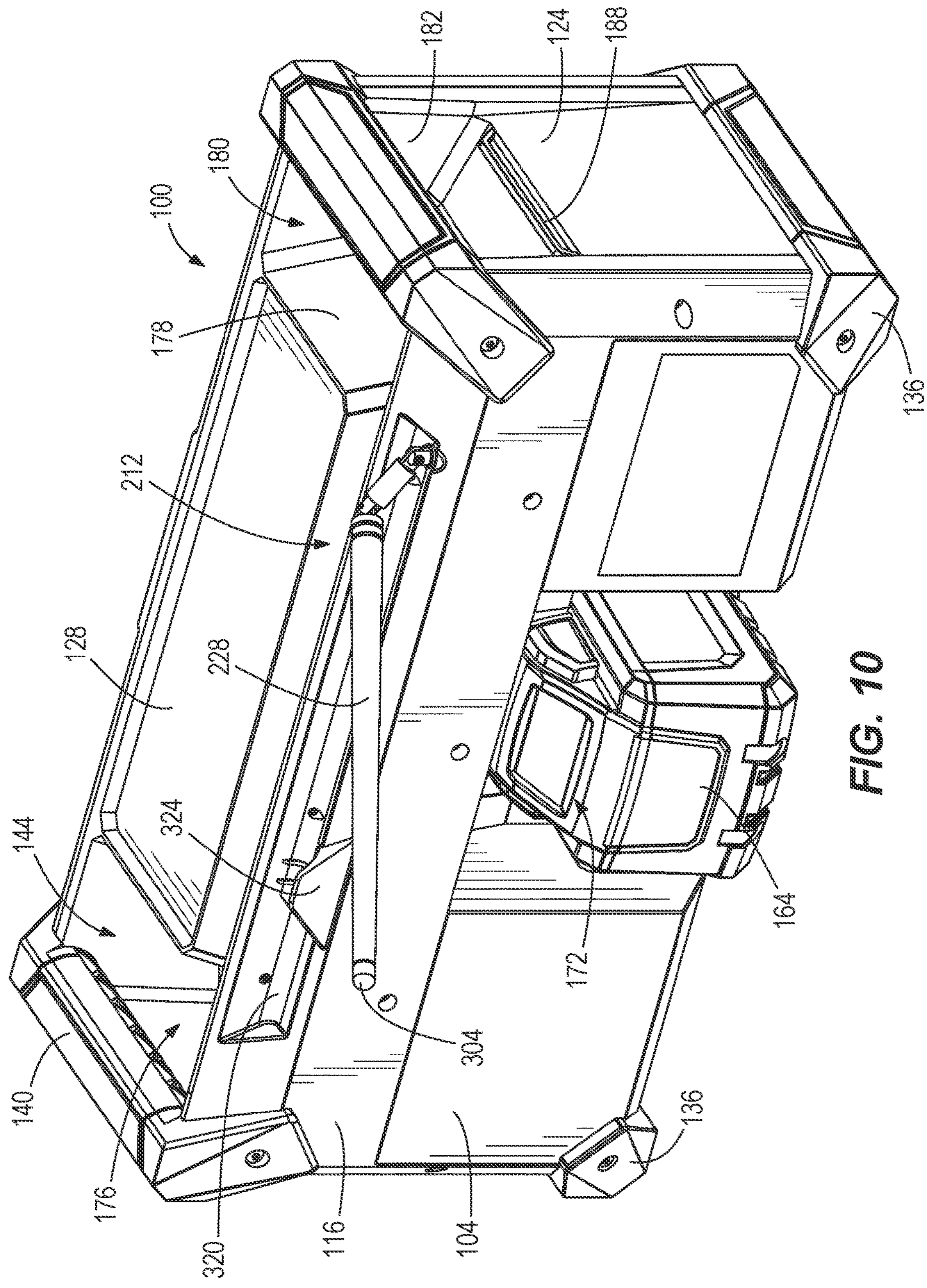
FIG. 10 is a rear perspective view of the audio device of FIG. 1 with an antenna assembly in an exemplary working position, in accordance with some embodiments.
Figure 11:
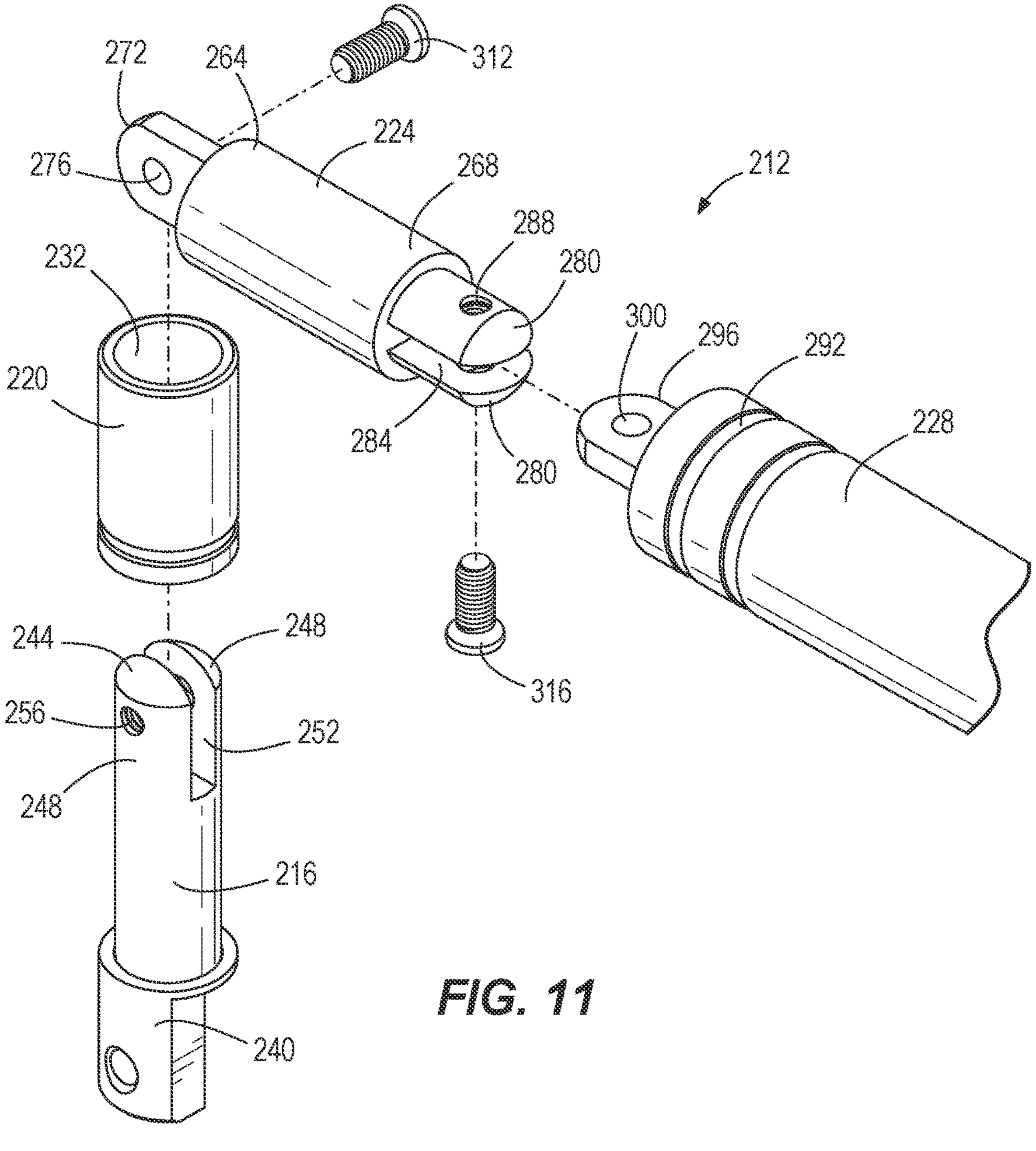
FIG. 11 is an exploded view of the antenna assembly of FIG. 10 in accordance with some embodiments.
Figure 12:
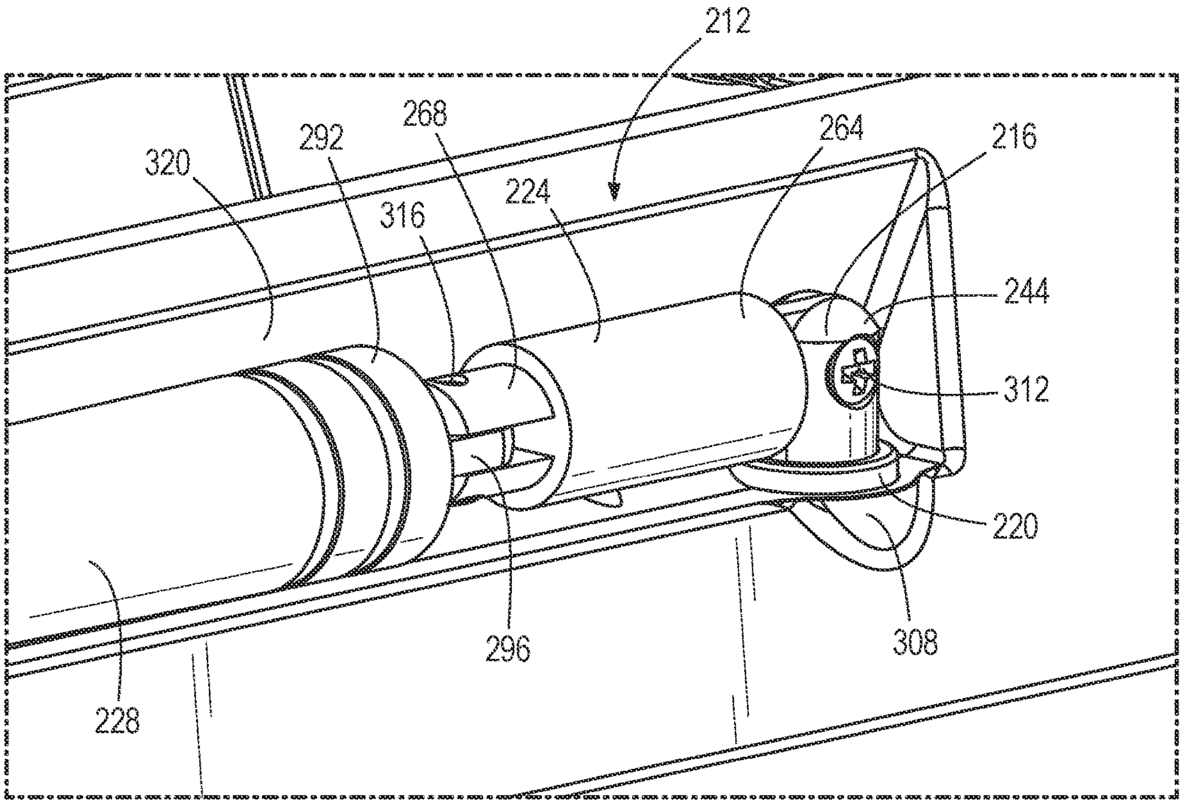
FIG. 12 is a detail view of the antenna assembly of FIG. 10 shown in a storage position in accordance with some embodiments.

Turning now to FIGS. 10-13, the antenna assembly 212 may be movable from a storage position (FIG. 4) to a plurality of working positions outside the storage position (e.g., FIG. 1, FIG. 10). The antenna assembly 212 includes a shaft 216 (for example, a first member), a collar 220, an intermediate member 224 (for example, a second member), and a rod 228 (for example, a third member).

The collar 220 is a cylindrical pipe shaped member and defines a central channel 232.

The shaft 216 includes a first shaft end 240 and a bifurcated second shaft end 244 (or distal end 244). The bifurcated end 244 is divided into two halves 248, or a pair of first halves 248. A channel 252 is defined between the halves 248. A pair of openings 256 are positioned in each of the halves 248.

The intermediate member 224 includes a first member end 264 and a second member end 268. The first member end 264 includes a flange 272 with an opening 276. The second member end 268 is bifurcated and includes two halves 280, or a pair of second halves 280, defining a channel 284 and having a pair of openings 288.

The rod 228 includes a first rod end 292 having a flange 296 with an opening 300, and a distal rod end 304 (FIG. 10). In some embodiments, the rod 228 may include a plurality of telescoping rods slidably coupled together to create an extendable rod assembly.

Figure 13:
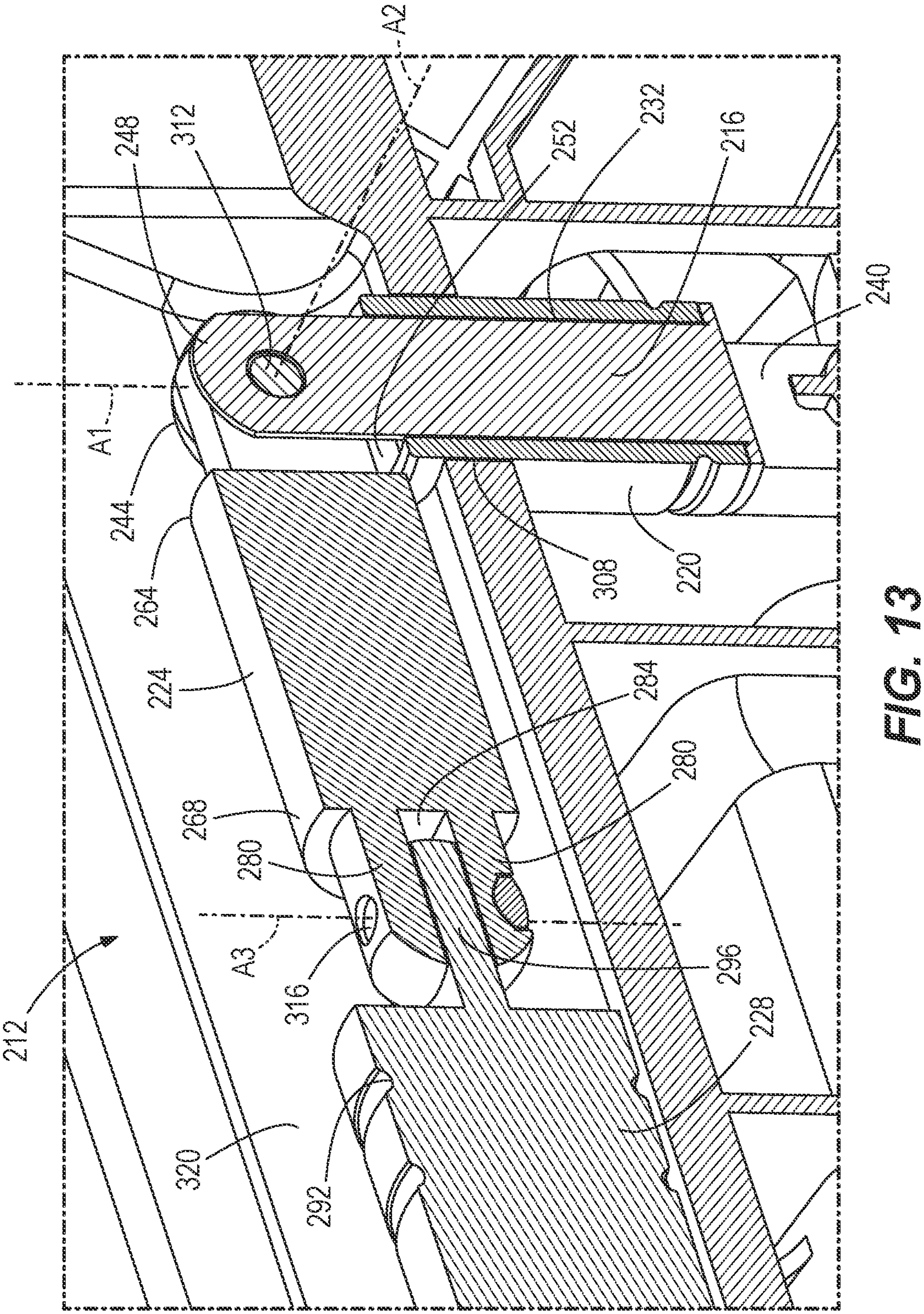
FIG. 13 is a section view of the antenna assembly of FIG. 12 in accordance with some embodiments.

As seen best in FIG. 13, once assembled, the collar 220 is mounted in an aperture 308 in the housing 104. The collar 220 is fixed to the housing 104 to prevent the collar 220 from moving relative to the housing 104. The shaft 216 is mounted within the central channel 232 of the collar 220 so that the first shaft end 240 is positioned within the housing 104 and the second shaft end 244 extends upwards, above the collar 220 and out of the aperture 308 in the housing 104. The shaft 216 is rotatably supported by the collar 220 to rotate about a first axis A1. Thereby, the shaft 216 is rotatably coupled to the housing 104 and is rotatable about the first axis A1. The shaft generally extends along the first axis A1. The intermediate member 224 is connected to the shaft 216 by positioning the flange 272 of the first member end 264 in the channel 252 defined in the bifurcated second end 244 so that the opening 276 in the flange 272 aligns with the pair of openings 256 in the two halves 248 of the bifurcated second end 244. A first fastener 312 may be positioned within the openings 256, 276 to secure the intermediate member 224 to the shaft 216. The intermediate member 224 is rotatable (or pivotable) relative to the shaft 216 about a second axis A2. The second axis A2 is perpendicular to the first axis A1. The first fastener 312 may extend along the second axis A2. The rod 228 is then coupled to the intermediate member 224 by similarly positioning the flange 296 in the channel 284 of the second member end 268 and positioning a second fastener 316 through the openings 288, 300. The rod 228 is rotatable (or pivotable) relative to the intermediate member 224 about a third axis A3. The third axis A3 is perpendicular to the second axis A2.

In the storage position (seen at least in FIGS. 3, 4, 12, and 13) the rod 228 is received by a recess 320 formed in the rear side 116 of the housing 104. The recess 320 may include a stabilizing feature 324 (FIG. 10) to secure the antenna assembly 212 in the storage position. The recess 320 is formed in the housing 140 so that when the antenna assembly 212 is in the storage position, the rod 228 is positioned within a footprint of the housing 104 to protect the antenna assembly 212. In the storage position, the third axis A3 is generally parallel to the first axis A1. In the storage position, the shaft 216, the collar 220, the intermediate member 224, and the rod 228 are all positioned in a common plane. In the illustrated embodiment, the common plane is parallel to the rear side 116 of the housing. The recess 320 is also positioned in the common plane.

When the antenna assembly 212 is moved out of the storage position, the antenna assembly 212 has a large range of positions. In some working positions, the antenna assembly 212 remains within the common plane. In some working positions, the rod 228 and/or the intermediate member 224 are rotated such that the distal rod end 304 is no longer disposed in the common plane. The large range of motion allows for greater dexterity in positioning the rod 228 to receive a radio signal. Additionally, the multiple axes of rotation also allow for the antenna assembly 212 to easily deflect if met with an unexpected force, decreasing the damage sustained by the antenna assembly 212 and the audio device 100.

Figure 14:
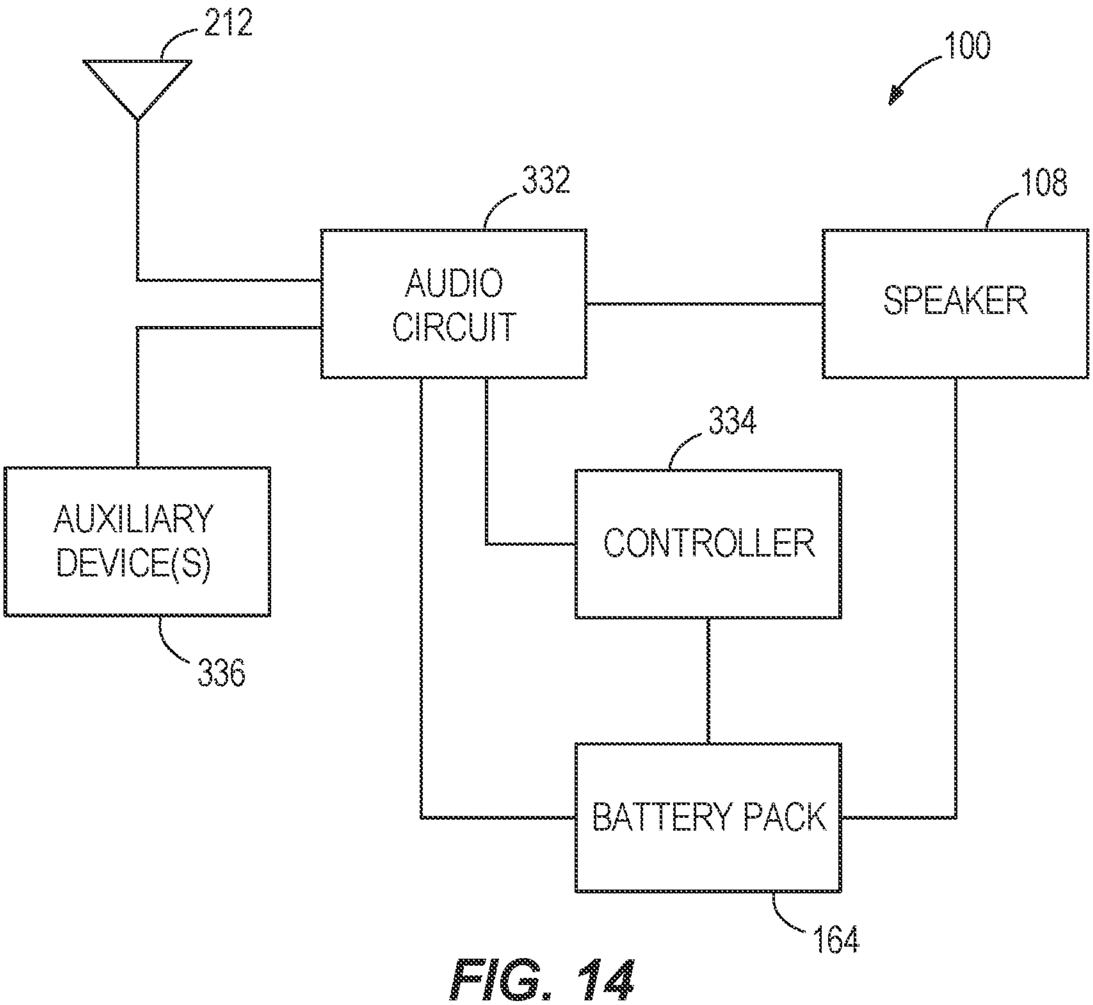
FIG. 14 is a simplified block diagram of the audio device of FIG. 1 in accordance with some embodiments.

FIG. 14 is a simplified block diagram of the audio device 100. The audio device 100 includes the audio circuit 332 providing audio signals to the speaker 108. The audio circuit 332 may be selectively connected to the antenna assembly 212 or one or more auxiliary devices 336. The audio circuit 332 receives audio signals or radio signals from antenna assembly 212 or one or more auxiliary devices 336 and provides corresponding audio signals to the speaker 108. The controller 334 controls operation of the audio circuit 332 and/or the speaker 108. The battery pack 164 provides operational power to the components of the audio device 100.

Thus, embodiments described herein provide, among other things, a portable worksite audio device. Various features and advantages are set forth in the following claims.

What is claimed is:

1. A worksite audio device comprising:
- a housing including a front side, a rear side, a pair of sidewalls, a top side, and a bottom side;
- a speaker disposed on the front side of the housing, wherein the speaker is configured to output audio;
- an audio circuit coupled to the speaker and configured to provide an audio signal to the speaker;
- a handle coupled to the housing, wherein the handle and the housing cooperate to define a recess, wherein the recess is defined between the top side and the first of the pair of sidewalls, wherein the recess is formed as a cutout from the first of the pair of sidewalls and includes a plurality of slanted surfaces; and
- wherein the recess is configured to receive and support an electronic device.

2. The worksite audio device of claim 1, further comprising
- a battery receptacle formed as an alcove cut out from a bottom surface along a rear side of the housing; and
- a battery pack removably coupled to the battery receptacle to power the audio circuit.

3. The worksite audio device of claim 1, wherein the handle is positioned at an upper edge of the housing, adjacent the top side and a first of the pair of sidewalls, and wherein the recess includes a device ledge positioned adjacent the first of the pair of sidewalls.

4. The worksite audio device of claim 3, wherein the handle is a first handle and the recess is a first recess, wherein the worksite audio device further includes a second handle positioned at another upper edge of the housing, adjacent the top side and a second of the pair of sidewalls, wherein the second handle defines a second recess including a recess formed between the top side and the second of the pair of sidewalls.

5. The worksite audio device of claim 3, further comprising:
- a rear device mount formed as a slot in a top surface of the housing, wherein the slot extends between the pair of sidewalls.

6. The worksite audio device of claim 1, further comprising an antenna assembly coupled to the audio circuit and configured to transfer a radio signal to the audio circuit, wherein the antenna assembly includes
- a first member rotatably coupled to the housing and rotatable about a first axis,
- a second member coupled to the first member, wherein the second member is configured to pivot relative to the first member about a second axis, perpendicular to the first axis, and
- a third member coupled to the second member, wherein the third member is configured to pivot relative to the second member about a third axis, wherein the third axis is perpendicular to the second axis.

7. The worksite audio device of claim 6, further comprising an antenna recess formed in a rear of the housing, wherein the antenna assembly is movable to be within the antenna recess in a storage position, and wherein when in the storage position the antenna is within a footprint of the housing.

8. A worksite audio device comprising:
- a housing including a front side and a rear side;
- a speaker disposed on the front side of the housing, wherein the speaker is configured to output audio;
- an audio circuit coupled to the speaker and configured to provide an audio signal to the speaker; and
- an antenna assembly coupled to the housing and configured to deliver a radio signal to the audio circuit, the antenna assembly including
  - a first member rotatably coupled to the housing and rotatable about a first axis,
  - a second member coupled to the first member, wherein the second member is configured to pivot relative to the first member about a second axis, perpendicular to the first axis, and
  - a third member coupled to the second member, wherein the third member is configured to pivot relative to the second member about a third axis, wherein the third axis is perpendicular to the second axis.

9. The worksite audio device of claim 8, further comprising:

a first handle coupled to the housing, wherein the first handle and the housing cooperate to define a first recess configured to receive a first electronic device; and a second handle coupled to the housing, wherein the second handle and the housing cooperate to define a second recess configured to receive the first electronic device or a second electronic device.

10. The worksite audio device of claim 8, wherein the antenna assembly is movable to a storage position, in which the third member is received within a footprint of the housing.

11. The worksite audio device of claim 10, wherein in the storage position the third axis is parallel to the first axis.

12. The worksite audio device of claim 11, wherein in the storage position the second member and the third member are positioned in a first plane, and wherein the antenna assembly is movable to a working position where both the second member and the third member extend transverse to the first plane.

13. The worksite audio device of claim 10, wherein in the storage position, the antenna assembly extends parallel to and adjacent a rear device mount formed as a slot in a top surface of the housing.

14. The worksite audio device of claim 8, wherein a distal end of the first member is divided into a pair of first halves and an end of the second member is received between the pair of first halves, and wherein an end of the second member is divided into a pair of second halves and an end of the third member is received between the pair of second halves.

15. The worksite audio device of claim 8, further comprising a plurality of device mounts formed as recesses of the housing and configured to support an electronic device to wirelessly communicate with the audio circuit.

16. A worksite audio device comprising:

a housing including a front side and a rear side;

a speaker disposed on the front side of the housing, wherein the speaker is configured to output audio;

an audio circuit coupled to the speaker and configured to provide an audio signal to the speaker;

an antenna assembly coupled to the housing and configured to deliver a radio signal to the audio circuit, the antenna assembly pivotable relative to the housing about two joints that are offset from one another such that the antenna assembly is rotatable with respect to the housing about a first axis, a second axis perpendicular to the first axis, and a third axis perpendicular to the second axis;

a handle coupled to the housing, wherein the handle and the housing cooperate to define a recess; and a first device mount disposed in the recess and configured to support an electronic device couplable to the audio circuit.

17. The worksite audio device of claim 16, wherein the audio circuit is configured to receive a device audio signal from the electronic device when the electronic device is coupled to the audio circuit.

18. The worksite audio device of claim 16, further comprising a controller configured to select one of the antenna assembly or the electronic device as an input, and configured to control the audio circuit to provide the audio signal to the speaker based on a signal from the input.

19. The worksite audio device of claim 16, wherein the antenna assembly is movable to a storage position in which the antenna assembly extends parallel to a rear device mount configured to support the electronic device.

* * * * *